United States Patent [19]

Squires et al.

[11] Patent Number: 4,876,491
[45] Date of Patent: Oct. 24, 1989

[54] METHOD AND APPARATUS FOR BRUSHLESS DC MOTOR SPEED CONTROL

[75] Inventors: John P. Squires, Jamestown; Louis J. Shrinkle, Boulder, both of Colo.

[73] Assignee: Conner Peripherals, Inc., San Jose, Calif.

[21] Appl. No.: 163,222

[22] Filed: Feb. 26, 1988

Related U.S. Application Data

[63] Continuation of Ser. No. 880,754, Jul. 1, 1986, abandoned.

[51] Int. Cl.$^4$ .............................................. H02P 6/02
[52] U.S. Cl. .................................... 318/138; 318/254
[58] Field of Search ........................ 318/254, 439, 138

[56] References Cited

U.S. PATENT DOCUMENTS

| | | | |
|---|---|---|---|
| 3,529,220 | 9/1970 | Kobayashi et al. | 318/254 X |
| 3,795,848 | 3/1974 | Schaub | 318/138 |
| 4,004,202 | 1/1977 | Davis | 318/254 X |
| 4,145,643 | 3/1979 | Maeda et al. | 318/696 |
| 4,158,795 | 6/1979 | Tarumi et al. | 318/254 X |
| 4,162,435 | 7/1979 | Wright | 318/138 |
| 4,262,237 | 4/1981 | Gelenius | 318/254 |
| 4,603,283 | 7/1986 | Oltendorf | 318/138 X |
| 4,617,499 | 10/1986 | Yuasa | 318/439 X |
| 4,692,674 | 9/1987 | Packard et al. | 318/138 X |

FOREIGN PATENT DOCUMENTS

54-136615  10/1979  Japan ..................... 318/254

Primary Examiner—Bentsu Ro
Attorney, Agent, or Firm—Fliesler, Dubb, Meyer & Lovejoy

[57] ABSTRACT

Control and synchronization of a polyphase, brushless DC motor (used for a hard-disk system) during initial start-up of the motor, is effected by monitoring rotor position using a high-frequency commutation: A short current pulse is applied to each power phase of the motor, and motor current conducted in response thereto, is measured to determine therefrom positional information of the rotor. From such positional information the identity of the appropriate motor phase to which is applied a torque-producing current is determined. Cycles of high-frequency commutation and application of torque-producing are performed, until the rotational speed of the rotor has attained a predetermined RPM. Motor speed is controled in synchronized, increasing fashion by continued monitoring of the motor current and back-EMF, until a desired rotational RPM is attained, whereupon torque-producing current is sequentially applied to each motor phase in synchronization with the rotor position by deriving positional information from the disk.

30 Claims, 5 Drawing Sheets

METHOD AND APPARATUS FOR BRUSHLESS DC MOTOR SPEED CONTROL

This is a continuation of application Ser. No. 880,754, filed July 1, 1986, now abandoned.

BACKGROUND OF THE INVENTION

The present invention is directed to DC motors, and more particularly to control of a polyphase, brushless DC motor used to move magnetic media, such as a disk of a hard-disk system, past a read/write element, such as a head, such as used in the technology known as Winchester Drives.

It is well known that conventional DC motors, including polyphase, brushless DC motors to which the present invention is directed, are highly efficient, and possess characteristics that make them suitable for a number of applications. In particular, brushless DC motors, which are particularly efficient, are favored as the moving force for such apparatus as rotating a mirror for laser printers, moving magnetic tape past a read/write head, or rotating the disk surface of hard-disk systems past a read/write head.

Polyphase, brushless DC motors require application of currents to armature windings in sequential order to produce torque-inducing flux for moving a rotor. DC currents are alternately switched about the armature windings to create various current paths that produce magnetic flux orientations in a synchronized fashion. The magnetic flux so produced results in a torque on the motor that causes rotational movement. In order to ensure that current is applied to the proper motor phase, (i.e., the most appropriate current path is selected through winding of the stator) in order to produce a torque at the most beneficial time, various sensing devices are used to provide positional information about the rotor.

One such device is a Hall effect device or "Hall Switch," although other devices such as optics, can be used. One problem with these sensing devices is that they are more prone to failures than the devices with which they are used, thereby significantly affecting the overall reliability of the apparatus that incorporates the sensing device. Additionally, incorporating these sensing devices in the motor structure itself increases the motors size, cost, complexity and power consumption—features not normally desirable.

It can be seen, therefore, that a significant improvement in motor design can be achieved if some other way were found to provide feedback information as to the rotational position of the rotor of a polyphase DC motor, without incorporating extra apparatus in the motor structure itself.

BRIEF DESCRIPTION OF THE INVENTION

Accordingly, there is disclosed herein a method, and apparatus for incorporating that method, for developing feedback information concerning the rotational position of the rotor without the use of sensing devices built into the motor structure itself. The method, as implemented, provides a highly reliable and inexpensive feedback mechanism that allows the motor structure to be reduced in size, complexity and cost, and to operate on less power than heretofore attained.

Broadly, the invention provides two alternate techniques for developing rotor position information, during initial set-up (i.e., from dead-stop to some RPM), and a third technique that can be used to maintain a desired speed of the disk of a hard-disk system by drawing position information from information written on the disk. In the preferred version of the invention, a polyphase, brushless DC motor is controlled in the environment of a hard-disk system. The motor drives a hard-disk, and all three techniques are used—in effect creating three zones of operation: A first zone utilizes one technique of the method to initiate rotation of the rotor from a static position to a first predetermined rotational speed or RPM. A second technique of the method is used to increase the rotational speed of the rotor from the first predetermined RPM to the desired RPM. Thereafter, using the third technique, information on the media being rotated by the motor is used to supply the necessary feedback information.

According to the preferred embodiment of the invention, the three-phase brushless DC motor used to drive the hard-disk (or disks if more than one) of a hard-disk system is supplied currents by a drive circuit that is operated by a microprocessor. Current through the motor is monitored by the microprocessor. During the first zone of motor operation, from 0 RPM to a first rotational speed, a high-frequency commutation, consisting of a short current pulse for each motor phase, is applied to the motor, and the motor current response to each pulse monitored. In response to this high-frequency commutation, the motor current responds with a corresponding number of pulses, one for each phase. It has been discovered that the amplitude of one of these motor current pulses will be greater than the rest, and that the motor phase producing this higher amplitude current indicates rotor position. Accordingly, the microprocessor determines which phase produced the highest motor current amplitude, and from that information, the microprocessor operates the drive circuit to provide a sustained torque-producing current that is applied to a phase (determined as described) for a fixed time, followed by another high-frequency commutation, followed again by another sustained torque-producing current, and so on until the first predetermined speed is attained.

Although this first technique, as outlined above, could be used to bring the motor to full speed, it has been found to be more efficient to use a second technique: The microprocessor, upon determining that this first predetermined speed is reached, switches to the second technique. At this point in time, the microprocessor has, for the moment, information as to the rotational position of the rotor and what next few motor phases current should be applied to. The motor current monitoring is continued (which is now indicative of the back-EMF produced by the motor) and compared to a predetermined limit as torque-producing current is applied to each phase of the motor. As the rotor nears the stable position corresponding to the motor phase to which torque-producing current is applied, the back-EMF substantially decreases, allowing motor current to increase. Accordingly, when the monitored current exceeds the predetermined limit, application of the torque-producing current is switched from the present motor phase to the next sequential motor phase, and the process continued until full speed attained. At that time, the monitoring operation switches to reading predetermined, spaced sector marks on the disk media, installed during the time of assembly of the disk structure, and used to supply feedback information for controlling and maintaining motor speed at the desired value.

A number of advantages are obtained by the present invention, which should be evident to those skilled in this art. In addition to removing sensing devices from the motor structure itself, thereby allowing the motor size, cost, etc. to be reduced, the present invention is capable of accommodating a variety of DC motors with varying characteristics. This advantage permits manufacturing costs to be further reduced since manufacturing specifications can range wider than before.

These and other advantages of the present invention will be readily evident to those skilled in this art upon a reading of the following detailed description, which should be taken in conjunction with the accompaning drawings.

DETAILED DESCRIPTION

Figure 1:
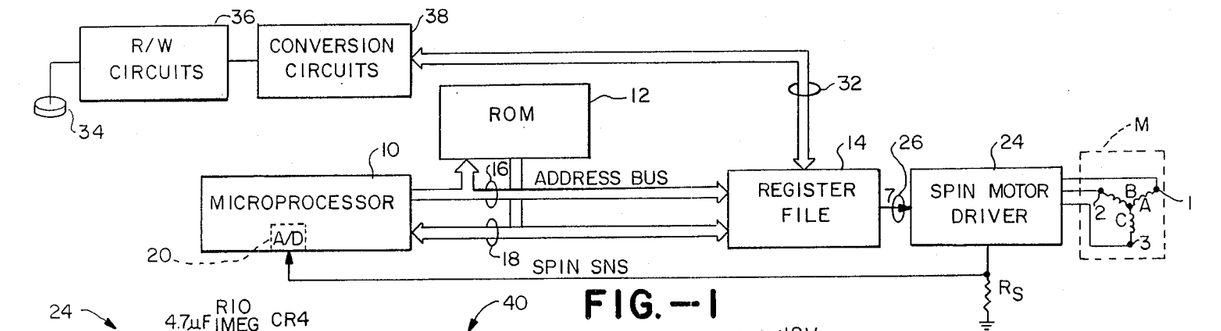
FIG. 1 is a simplified block diagram of the microprocessor and associated circuitry used to implement the present invention for controlling a polyphase brushless DC motor M.

The present invention is used to operate a polyphase, brushless DC motor, such as illustrated in FIG. 1 with the reference letter M. Typically, and herein, current is caused to flow through the coils A, B, C of the stator of the motor M by applying to one of the nodes 1, 2, 3 one voltage, connecting to another one of the nodes 1, 2, 3 to a second voltage (usually ground), and leaving the remaining node unaffected, or open circuited. Thus, for example, if a positive voltage is applied to the node 3 and node 2 coupled to ground, current will flow from node 3 to node 2 through the coils C and B in one "phase" of the motor M. Similarly, if a positive voltage is applied to node 1, ground applied to node 3, and node 2 left unaffected (open circuited) current is applied to the motor M through coils A and C.

In a three-phase DC motor, such as described herein with the present invention, there are six available phases (i.e., six current paths through the coils A, B and C) capable of positioning the rotor (not shown) of the motor M in a stable position. For each such phase, there are two stable rotor positions.

The construction of the motor M itself is not unique, it is constructed in accordance with conventional and well-known techniques and materials (having a stator supporting multiple field or phase windings opposite permanent magnetic pole pieces supported on a rotor; the torque inducing action of the phase currents effecting rotor movement by generating electromagnetic fields that interact with the permanent magnetic fields of the respective rotor poles), with one exception: There are no sensing devices, such as Hall switches or the like, to provide feedback information concerning the rotational position of the rotor. Rather, that information is supplied by the methods of the present invention, which will now be described.

As FIG. 1 illustrates, a microprocessor 10 is coupled to a read-only memory (ROM) 12 and a register file 14 by an address bus 16 and a data bus 18. The microprocessor 10 is manufactured by Motorole, Inc., and identified by the Part No. MC68HC11. A description of microprocessor 10 can be found in "Motorola Technical Data Handbook. MC68HC11A8," 1975 Edition, published by Motorola, Inc. The interesting feature of the microprocessor, insofar as is of concern herein, is that it includes as on-board analog-to-digital (A/D) converter 20, the use of which will be described hereinafter.

The register file 14, insofar as is of concern herein, consists primarily of registers for holding control information that is applied to a spin-motor driver 24 in the form of control signals that are communicated thereto on six signal lines 26. In response to the control signals, the spin-motor driver operates to switch application of a positive voltage and ground to various pairs of the nodes 1, 2, 3 of the motor M (leaving a third node attached to a high impedance), as briefly described above. The current through the motor M, during the time a positive voltage and ground are applied thereto, develops a voltage across a sense resistor $R_s$ that forms a spin sense (SPIN SNS) signal. As will be seen, the SPIN SNS signal includes information indicative of the rotational position of the rotor (not shown) of the motor M. Accordingly, the SPIN SNS signal is applied to the A/D 20 of the microprocessor 10, producing digital information used by the microprocessor 10 to control motor operation via the control signals applied to the spin-motor driver 24 via the signal lines 26.

As FIG. 1 also illustrates, the register file 14 is connected to conversion circuits 30 via an eight-bit bus 32. Conversion circuits 30 are, in turn, connected to a read/write head 34 via read/write (R/W) circuits 36. Additional registers (not shown) are contained in the register file 14 to buffer data communicated between the microprocessor 10 and the conversion circuits 38.

As indicated above, the present invention is used in connection with a hard-disk drive using Winchester technology (technology in which the heads do not come into contact with the magnetic media; rather, the heads "fly" on a cushion of air that separates the heads from the media). Since the present invention is directed only to control of the motor used to spin the disk media, only that portion of the hard-disk system germane to the present invention as illustrated and discussed.

Figure 2:
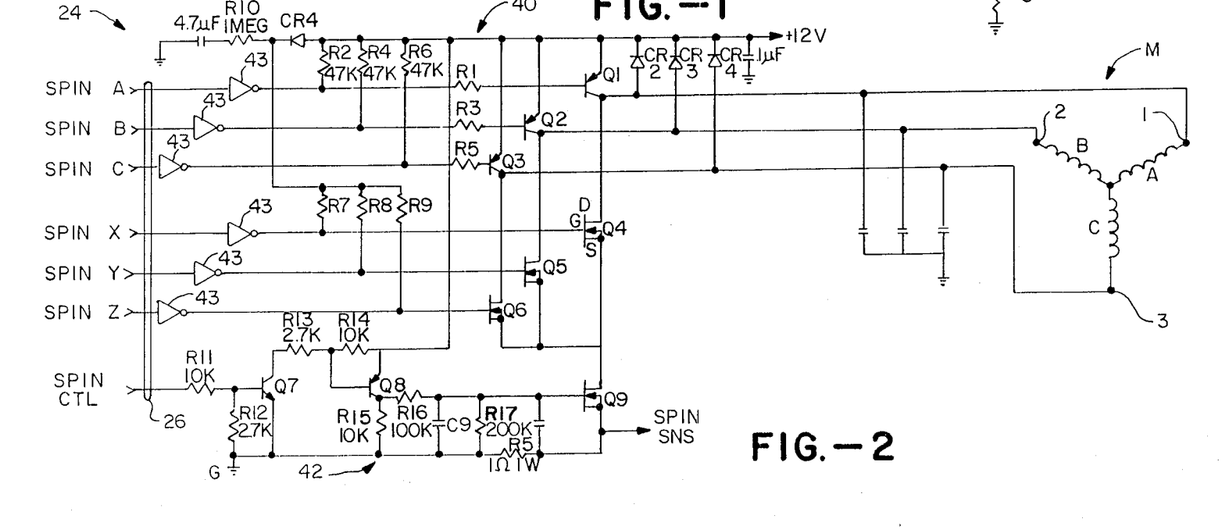
FIG. 2 is a detailed schematic diagram of the spinmotor driver used in the block diagram of FIG. 1 to apply torque-producing currents to the motor in response to commands from the microprocessor.

Turning now to FIG. 2, the construction of spinmotor driver 24 is illustrated in greater detail. Spin motor driver 24 includes two major sections: A switching section 40, which receives control signals SPIN A, B, C, X, Y and Z that effect switching of a positive voltage (+12 V) and ground potential between pairs of the nodes 1, 2, 3 of the motor M; and a current control section 42 that converts a pulse-width-modulated digital signal to a voltage for controlling the amplitude of the current applied to whatever phase (i.e., pairs of nodes 1, 2, 3) the motor M selected by the switching section 40 (in response to the control signals SPIN A, ..., Z). The current control section 42 includes the sensor resistor $R_S$, producing the SPIN SNS signal.

Referring first to a switching section 40, the control signals SPIN A, B and C are coupled through inverter/buffer amplifiers 43 to the base leads of PNP transistors Q1, Q2 and Q3, each of which has their emitter leads connected to the positive DC supply voltage (+12 V), and their collectors respectively connected to the motor nodes 1, 2, 3 high-current handling field-effect transistors (FETs) Q4, Q5, Q6.

Similarly, the control signals SPIN X, Y and Z, are coupled, via inverter/buffer amplifiers 43, to the gates of the FETs Q4, Q5 and Q6. FETs Q4, Q5 and Q6 function, in response to the received control signals, to alternately switch ground potential (through the FET Q9 of the limit circuit 42) to other of the motor nodes 1, 2, 3.

Turning now to the current control section 42, the control signal spin control (SPIN CTL) is received at the base of an NPN transistor Q7 that forms a part of an amplifier supplying current drive to an integrator comprising the PNP transistor Q8, resistors R16 and R17 and capacitors C8 and C9. When received, the SPIN CTL signal operates to produce a positive-going ramp at the gate of limit transistor, FET Q9, during the time that the SPIN CTL signal is present or HIGH. When the SPIN CTL signal goes LOW, the voltage ramp applied to the gate of FET Q9 reverses direction and diminishes at approximately the same rate it rose.

Operation of the spin-motor driver 24 is in response to the control signals SPIN A, B, C, X, Y and Z: Assume that a current is desired to be caused to flow through the coils A and C from node 1 to node 3, to induce a particular torque-producing motion. The control signal SPIN A is brought HIGH to, via the amplifier 43, pull the base lead of the transistor Q1 LOW, causing the positive DC voltage (°12 V) to be applied to node 1 of the motor M. At the same time, the SPIN Z control signal is brought LOW to place the FET Q6 in conduction, effectively connecting node 3 of motor M to ground G potential through the limit transistor Q9 and sense resistor $R_S$. The control signals SPIN B and C remain LOW and X and Y remain HIGH, leaving transistors Q2 and Q3 and FETs Q4, Q5 in non-conducting, high-impedance states.

When a current path through the motor M is selected by switching section 40, the SPIN CTL signal is applied to regulate the amount of current conducted through the coils A and C via the FED Q9, which is also the current that passes through the sense resistor $R_S$ to produce the SPIN SNS signal.

Figure 3:
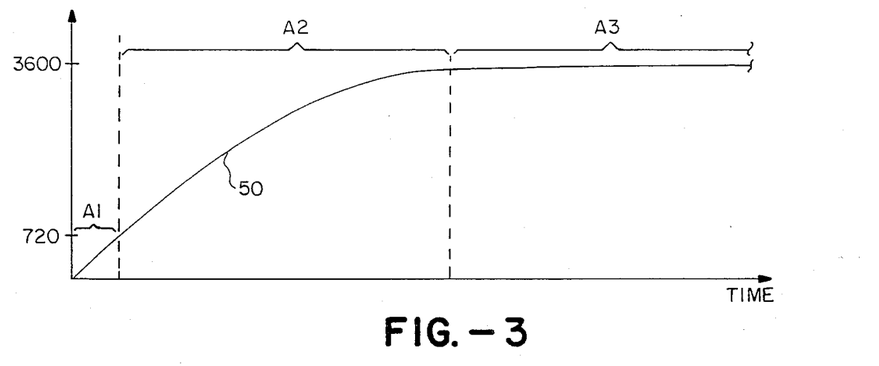
FIG. 3 is a motor speed curve, illustrating the different zones of operation of the present invention.

Referring briefly to FIG. 3, the curve 50 shown generally represents motor speed from a static condition to the full-speed operation (3600 RPM). FIG. 3 is presented to illustrate the three zones of control, each of which utilizes one of the three different control techniques. Zone A1 brings the motor M from a standing start to approximately 20% of full-speed operation (i.e., 720 RPM). Zone 2 brings the motor speed from 720 RPM to the full speed of 3600 RPM. Zone 3 is the maintenance aspect of the invention, maintaining the 3600 RPM rotational speed of the motor M.

Figure 4:
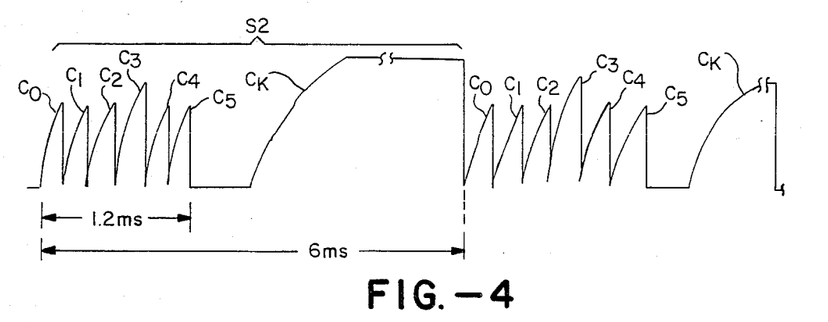
FIG. 4 is a diagrammatic illustration of the high-frequency commutation produced by the invention during the first zone of operation.

FIG. 4 illustrates the response of the SPIN SNS signal to cycles of high-frequency commutation, comprising application of a short (200 microseconds ($\mu$)) pulse of current to each of the six motor phases, followed by a sustained (for 4.8 milliseconds (ms)) application of current to a motor phase determined from examination of the responses $C_\phi, \ldots, C_5$.

Although described more fully below with respect to the flow diagram of FIGS. 6A-C, the invention proceeds broadly in the following manner: Each of the six motor phases ($P_0$-$P_5$) has a short pulse of current applied thereto, resulting for each applied pulse in the current pulses $C_\phi, \ldots, C_5$ continued in SPIN SNS (FIG. 4). One responsive current pulse $C_\phi, \ldots, C_5$ will have an amplitude greater than the others. The current pulses are monitored by the microprocessor 10, which determines the peak amplitude of each current pulses and compares them to one another, determining which has the greater amplitude. This identifies the phase position of the rotor, so that the high-frequency commutation is followed by application of a torque-producing current applied to the appropriate motor phase. FIG. 4 illustrates determination, from the response to the high-frequency commutation (i.e., current pulses $C_\phi, \ldots, C_5$) that the rotor is indicated as being in a phase 3 position; thus, the torque-producing current that follows will be current applied to phase 5.

Figure 5:
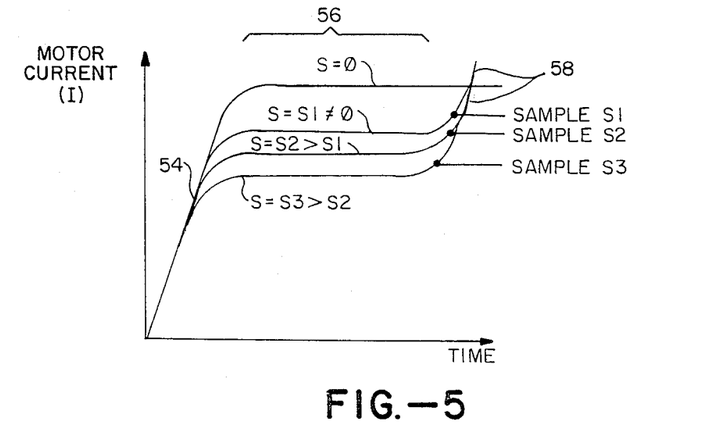
FIG. 5 is an illustration of different motor currents encountered during the second mode of operation of the invention.

At a motor speed of approximately 720 RPM (20% of the desired full-speed value of 3600 RPM), the second technique of the invention is utilized to synchronize application of torque-producing current motor to the different phases. During zone A2 operation, the microprocessor continues the monitor the SPIN SNS signal, first comparing it to a previously sampled value, later to a readjusted value, to determine when to switch the current from one phase to the next sequential phase of the motor M. Illustrated in FIG. 5 is a generalized representation of motor current (through $R_s$) with respect to time, showing a static motor current (S=$\phi$), and other motor current curves at different rotational speeds (S=S1, S=S2>S1, and S=S3>S2). When the rotor is moving, the SPIN SNS signal, developed across $R_s$ in response to a torque-producing current applied to any particular motor phase, has three major portions: A first rising portion 54, followed by a relatively stable portion 56, followed by a second rising portion 58. As will be seen, the second rising portion tells the microprocessor 10 when to switch the current applied by the spin motor drive 24 to the next sequential phase of motor M.

Figure 6A:
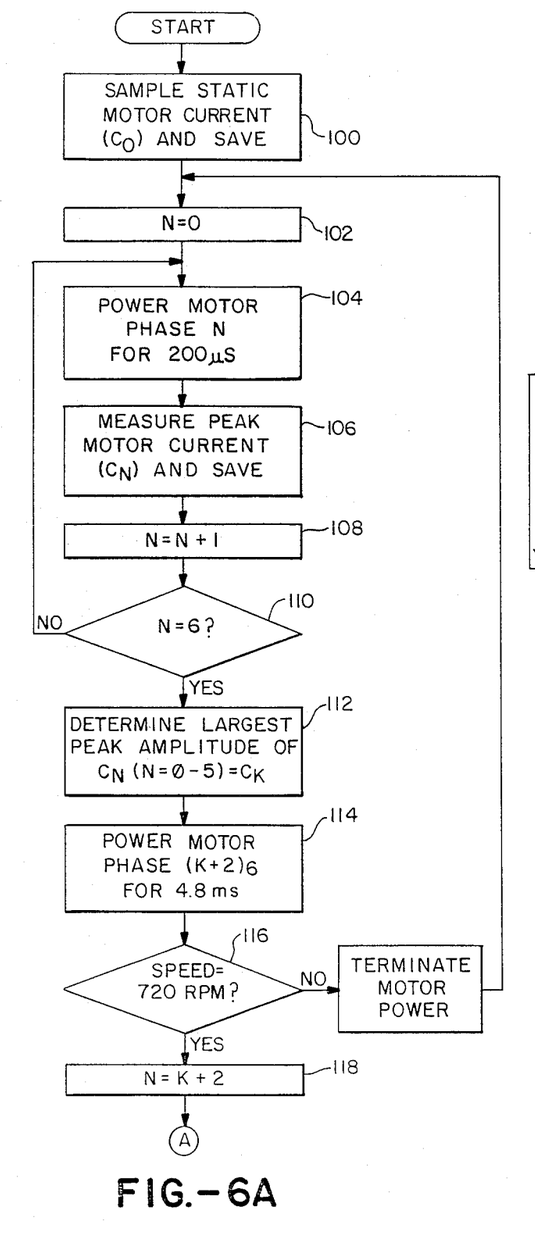
FIGS. 6A–C are flow charts that describe the three zones of operation of the method of the present invention.

With reference to FIGS. 6A-C, together with FIGS. 1, 2 and 4, the invention initiates motor operation in the following manner: At step 100 (FIG. 6A) the microprocessor 10 forms an appropriate control word, and communicates that control word for storage in the register file 14. The stored control word forms control signals that are communicated on the seven (7) signal lines 26 to the spin motor driver 24, causing the switching section 40 to select a phase of Motor M (presently in its static, non-rotating state), while the SPIN CTL signal selects a current level. A voltage curve generally of the shape shown in FIG. 5 (S=O) is developed across the sense resistor $R_S$, and sampled by the microprocessor 10 and stored in an internal register (not shown) as a value $C_o$.

Next, in step 102, an internal counter (not shown) of microprocessor 10 is loaded with a counter value (N) of 0. This counter value (N), as will be seen, will define motor phase to which current that is to be applied.

Steps 104, 106, 108 and 110 form the routine performed by the microprocessor 10 for high-frequency commutation of the motor M, the result of which is illustrated in FIG. 4 by the current pulses $C_0, \ldots, C_5$.

At step 104 current is applied to the phase determined by the counter value N for approximately 200 μ. The SPIN SNS signal is monitored for a peak motor value by the microprocessor 10, and that peak value for that particular phase ($C_n$) is saved. At step 108, the counter value N, i.e., the value that identifies phase, is incremented, and at step 106 the determination is made as to whether or not all six of the motor phases have had a 200 μ current pulse applied. If not, steps 104, 106, 108 and 110 are repeated.

When it is determined that all six phases of the motor M have experienced application of the 200 μ pulses of current, operation proceeds to step 112, in which the microprocessor 10 determines which of the measured amplitudes of SPIN SNS is greater than the others. With this information, which is indicative of the position of the rotor in one of the two phase-related stable positions, the microprocessor 10 can select the most appropriate phase of the motor for application of a sustained (for approximately 4.8 ms) torque-producing current.

In the example illustrated by FIG. 2, the high-frequency commutation of the six phases of the motor M will produce the current pulses $C_0, \ldots, C_5$ and the microprocessor 10 will find, from comparison of the amplitudes of the current pulses $C_0, \ldots, C_5$ that current pulse $C_3$ is greater than the rest, indicating that the rotor (not shown) of motor M is in one of the two phase 3 stable positions. Accordingly, maximum torque for the motor, as is well-known in this art, will require application of a current to phase 5 of the motor (i.e., K, indicating motor phase, is 5).

The cycle high-frequency commutation current pulses $C_0, \ldots, C_5$, followed by a sustained current (4.8 ms) to phase K (K being determined by the largest amplitude current pulse, as indicated above) continues. Initially, from no rotation, the rotor will not move and, therefore, as indicated in FIG. 4, initially, for the first few cycles, one particular phase-related current pulse $C_K$ will be greater in magnitude (as FIG. 4 illustrates, K=5). Ultimately, however, the rotor (not shown) of the motor M will begin to rotate and other current pulses will begin sequentially assuming amplitudes greater than their mates, although lower speed groups of the cycles 52 will see these same current pulse having a greater amplitude than the others. Shortly, however, the rotor will attain a rotational speed from phase-related position to phase-related position that begins to equal the period of the cycle 52 (i.e., approximately 6 ms). During this zone A1 (FIG. 3) operation, the microprocessor 10 can track motor speed from the period-to-period changes of the current pulses.

Accordingly, the microprocessor performs, at step 116 (during the 4.8 ms period a torque-producing current is applied to the previously determined phase K), performs a check of motor speed. If the motor speed is below a predetermined rotational velocity (here, 720 RPM), the microprocessor will wait for the conclusion of the 4.8 ms period, and terminate the motor current to phase K, and return to step 102 to perform another cycle 52 of high-speed commutation, followed by a torque-producing current (i.e., steps 102-116).

If, on the other hand, it is found during step 116 that the motor speed has attained (or exceeded) the first predetermined speed, the first zone A1 of operation (FIG. 3) is concluded by setting the counter value N to a value that identifies the next phase of the motor to which a torque-producing current is to be applied, at step 118. A routine of FIG. 6A is exited at A which is also an entry point to a second routine of FIG. 6B, which performs the motor control of zone A2.

It is believed that the procedure identified in FIG. 6A, discussed above, can be used to run the motor speed up to the desired full speed operation (3600 RPM). However, it is more efficient to use another technique; that technique being the routine represented by the flow diagrams illustrated FIG. 6B.

Figure 6B:
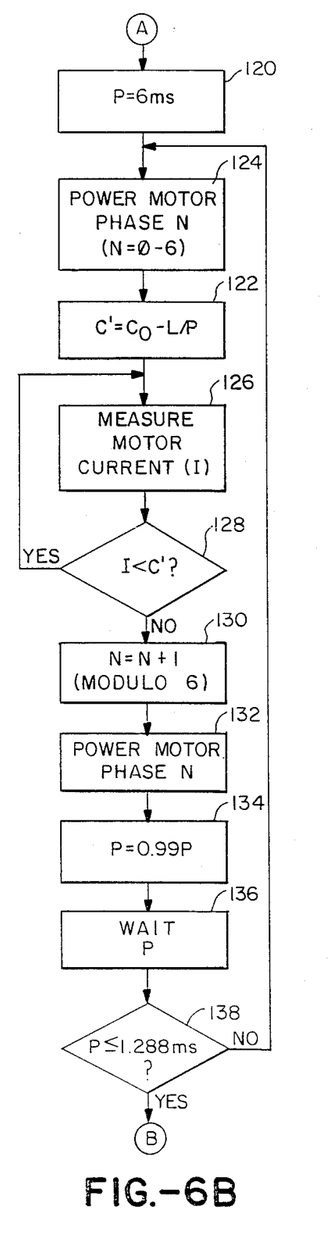

The routine of FIG. 6B is entered at step 120, with an internal register (not shown) of the microprocessor 10 being set to a value (P) representing the period of rotation of the motor M. At the time step 120 is entered (immediately preceded by the exit of step 118, FIG. 6A), the microprocessor has information as to the rotational velocity of the motor M and the next sequential phase (a torque-producing current).

At step 122 torque-producing current is applied to the phase identified by the phase value N which, in the initial entry of the procedure of FIG. 6B was obtained in the exit step 118 of the procedure of FIG. 6A.

Briefly, the procedure of zone A2 involves comparing the amplitude of the current through the motor, responsive to application of a torque-producing current, to a predetermined value. The motor current, as illustrated in FIG. 5, by the curves S=S1, S=S2 and S=S3 will exhibit an initial rise 54, followed by a leveling off 56. As the rotor (now shown) of the motor M responds to the torque produced by the application of current, it will rotate towards its corresponding stable position. When that stable position is approached, the back-EMF is reduced, and the current level rises. This indicates that torque-producing current must be switched from the particular phase (K) to which current is being presently applied to the next sequential phase (K+1). The times between the initial rise 54 of current through the motor to the secondary rise 58 is relatively substantial in terms of microprocessor time (beginning at approximately 6 ms up to approximately 1 to 2 ms at full RPM). Accordingly, during the portion 56 of each current curve (FIG. 5) the microprocessor can be used for other operations. Therefore, the microprocessor 10 can use windowing; that is, after switching torque-producing current from one phase to another, it can leave to perform other operations, returning at a particular time to begin looking for the secondary rise 58 of motor current. However, as motor speed increases, motor current will decrease (due to the increase in back-EMF), as indicated by the curves S=S1, S=S2 and S=S3, where S is the motor speed and the motor speed S1 is less than the motor speed S2 which in turn is less than the motor speed S3. The procedure of FIG. 6B includes a technique for moving the "window" used by the microprocessor 10 to look for the secondary rise of current 58 toward the initial rise 54.

Thus, at step 122 (FIG. 6B), to compensate for the declining value of the knee of the secondary rise 58 as the motor speed increases, a switch value C' is calculated using the formula $$C' = C_0 - L/P$$

where $C_0$ is the static motor current value determined in step 100 (FIG. 6A),

L is a predetermined value determined by the characteristics of the motor construction and the environment in which the motor is used, and P is the period value previously set in step 120 to 6 ms and, as will be seen, modified as motor speed increases.

Motor current (I) is then monitored, through the SPIN SNS signal received at the A/D 20 of the microprocessor 10 and compared to the value of C' calculated in step 122. If the measured motor current I does not exceed the value C', the monitoring procedure continues. However, if the test at step 128 determined that the motor current I does exceed the value C', indicating that the knee of the secondary rise 58 is reached, the test of step 128 falls through to step 130, where the phase number is incremented (i.e., the internal counter of the microprocessor 10 is run as a modulo 6 counter) and the torque-producing current switched (through the manipulation of the transistors Q1–Q6 of the switching section 40 of spin motor driver 24-FIGS. 1 and 2) to the next sequential phase.

At step 134, the period of value P is recalculated to account for the expected increase of motor speed, at step 136 the microprocessor waits (or more accurately, is allowed to perform other operations) for a time period determined by the period value P, and at step 138 a test is made, using the period value P to determine if full speed operation (3600 RPM) is attained. If not, the procedure returns to step 124 to recalculate the current value of C', to account for the expected motor speed increase (which, in turn, will lower the knee of the secondary current rise 58 (FIG. 5) and steps 124–138 performed again.

The operation of the procedure shown in FIG. 6B continues until, at step 138, it is determined that motor speed has reached 3600 RPM. If so, the procedure of FIG. 6B is exited in favor of the procedure shown in FIG. 6C which is the 3600 RPM maintenance procedure.

Figure 6C:
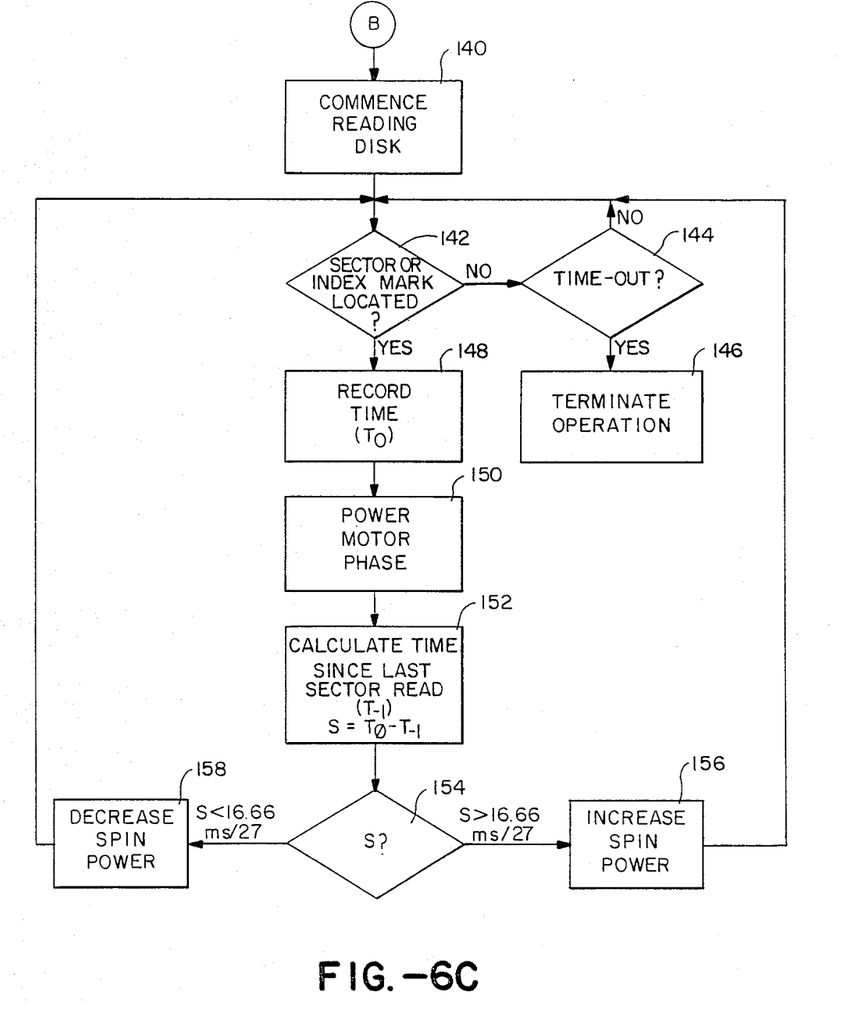

The procedure of FIG. 6C obtains the necessary feedback from information written upon the hard-disk media being driven by the motor M. Thus, before entering a discussion of the procedure of FIG. 6C, a discussion of what is written and the relationship to the motor will be beneficial.

Figure 7:
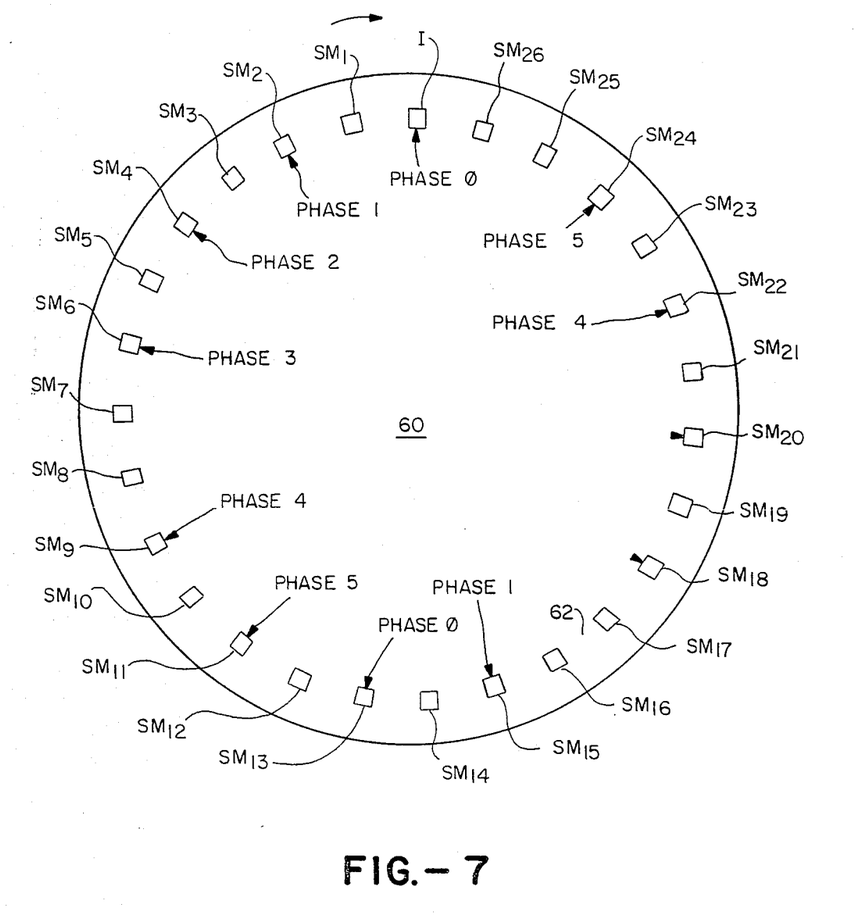
FIG. 7 is a representation of one surface of the magnetic media driven by the present invention to illustrate feedback information recorded thereon.

The hard-disk system with which the motor M and invention can be used can be multiple disk, providing multiple surfaces carrying magnetic media. One such surface 60. During manufacture of the hard-disk system with which the present invention would be incorporated, a number of concentric tracks of information, one of which is illustrated in FIG. 7 as track 62, are written on the surface 60. The information written on each track includes an index mark I, and 26 sector marks $SM_1, \ldots, SM_{26}$, making a total of 27 marks. The index mark I is written at a location that corresponds substantially to one phase position of the rotor used to drive the hard-disk that carries surface 60. Thus, the index mark I as well as the sector marks $SM_1, \ldots, SM_{26}$, provide positional information of the rotor. The index mark I and sector marks $SM_1, \ldots, SM_{26}$ each include approximately 60 bytes of information, and there are 512 bytes reserved for a user between each of the index and sector marks.

Turning now to FIG. 6C, the procedure there illustrated, which is entered from the procedure from FIG. 6B begins at step 140, in which the track 62 (which could be any of the tracks on the surface 60) is continually read in an attempt to find the index mark I or one of the sector marks $SM_1, \ldots, SM_{26}$. Each sector or index mark is compared to the bit pattern of the index mark I includes data identifying it (or not identifying it, as the case may be) with an associated motor phase. Thus, for example, the index mark I and sector mark $SM_{13}$ include data identifying them with motor phase $\phi$. In similar fashion, sector marks $SM_2$ and $SM_{15}$ are identified with phase 1, and so on.

Under continued control of the microprocessor 10, the search of step 142 until one of a predetermined number of the sector marks and index mark is located. It will be noted that, as indicated above, a three-phase DC motor will have 12 phase positions (two for each power phase). However, as indicated in FIG. 7, there are 27 substantially equally spaced markers (index mark I and sector marks $SM_1, \ldots, SM_{26}$) recorded for each track 62. Only certain of those markers are used for motor synchronization. From the index mark, there is determined a pattern of 2, 2, 2, 3 from the index mark I that is used to sequentially switch the motor phases to which the torque-producing current is applied. Thus, for example, as illustrated in FIG. 6, if the index mark I is used to identify application of a current-producing torque to phase $\phi$, sector marks $SM_2$, $SM_4$, $SM_6$, $SM_9$, $SM_{11}$, $SM_{13}$ are used for switching phases 1, 2, 3, 4, 5, and 0, respectively. In similar fashion, sector mark $SM_{15}$, $SM_{18}$, $SM_{20}$, $SM_{22}$, and $SM_{24}$ will switch application of torque-producing current to phases 1, 2, 3, 4, and 5, respectively.

The search procedure includes a step 144 that tests for the amount of time to locate the index or one of the sector marks. If that time is exceeded, motor operation is terminated by the microprocessor 10 at step 146 (i.e., the commutation of the motor is stopped and the media rotation is allowed to spin down).

If, on the other hand, as will be more usually the case, the index mark or one of the predetermined sector marks (I, $SM_2$, $SM_4$, ..., $SM_{24}$) is found, the time is recorded and saved by the microprocessor 10 in step 148. Next, at step 150, a torque-producing current is switched by the microprocessor 10 to the motor phase identified by data included in the index or sector mark.

At step 152 the time ($T_{-1}$) of the last located index or sector mark and the time ($T_\phi$) *of the present located index or sector mark are used to calculate the sector time period* $T_0-T_{-1}$. From this value, the rotational sector speed (S) of the disk 60 is indicated.

The microprocessor 10, in step 154, then determines if the rotational sector speed (S) of the disk 60 is too slow (i.e., if S is greater than 16.66 ms/27). If so, disk speed is increased in step 156 by the microprocessor 10 by providing a SPIN CTL signal to section 42 (FIG. 2) of an appropriate width. If, on the other hand, S is found to be less than the ideal time since the last index or predetermined sector mark, motor speed is decreased in step 158 by the microprocessor 10 by providing a SPIN CTL signal with a smaller pulse width.

Thus, the control apparatus and method of operation for a DC commutatorless motor wherein the rotational position of the rotor may be reliably determined without using separate sensing devices to obtain positional feedback information, has been described.

In view of the above teachings, many modifications and variations of the present invention are naturally possible by those skilled in the art. Therefore, it is to be understood that within the scope of the appended claims, the present invention may be practiced otherwise than as specifically described and shown herein.

We claim:

1. In a brushless DC motor having multiple stator windings and a rotor, apparatus for controlling ordered application of electrical current to the stator windings, comprising:

circuit means coupled to the stator windings for selectively creating current paths there through in response to control signals;

sensing means coupled to the DC motor for producing a sense signal indicative of current conducted by the DC motor; and control means coupled to the circuit means and to the sensing means for providing the control signals in a manner to cause current to flow through the current paths selectively formed by the circuit means in response to the control signals, effecting rotation of the rotor;

the control means including means for producing pulse signals to cause selective application of high-frequency current pulses to the stator windings and means for monitoring the pulse signals to determine which of the high frequency current pulses produces a high amplitude pulse signal relative to those of the other high frequency current pulses, the control means being operable in response to a determination by said monitoring means to provide the control signals to the circuit means.

2. A method of initiating and controlling the rotation of a rotor of a brushless DC motor of the type having multiple windings, related as phases, for conducting torque-producing current therethrough, comprising the steps of:

sequentially powering each phase of the DC motor for a short predetermined time period;

obtaining a peak amplitude value of the current conducted by the motor when a phase is powered during each corresponding short predetermined time period;

determining a one-peak amplitude value having a magnitude greater than the other peak amplitude values; and applying a torque-producing current to the DC motor in a phase determined by the determined one-peak amplitude value.

3. The method of claim 2 including the step of:

deriving the rotational speed of the rotor from successive ones of the determined peak amplitude value.

4. The method of claim 3 including the steps of:

terminating the sequentially powering, obtaining, determining, applying, and deriving steps at a predetermined rotational speed of the rotor;

ascertaining a static motor current value;

supplying a motor current to the predetermined power phase of the motor;

measuring the motor current; and switching application of the motor current to the next sequential power phase of the motor when the measured motor current exceeds the static motor current value.

5. A commutatorless direct current motor having a rotor for rotating with respect to a stator, said motor comprising:

(a) means, provided on the rotor, for establishing a plurality of first magnetic fields;

(b) means, provided on the stator, for inducing a second magnetic field; and (c) control means, coupled to said inducing means, for directing a discrete short-period inducement of said second magnetic field and a discrete long-period inducement of said second magnetic field wherein said discrete short period inducement is insufficient to cause rotation of said rotor and said discrete long-period inducement is sufficient to cause rotation of said rotor, said control means including means for monitoring the interaction of said discrete short-period induced second magnetic field with said first magnetic fields.

6. The motor of claim 5 wherein said control means identifies the rotational orientation of said discrete short-period induced second magnetic field with respect to a specific one of said first magnetic fields.

7. The motor of claim 6 wherein said control means, in response to said monitoring means, identifies a subset of the possible rotational positions of said establishing means with respect to said inducing means and wherein said control means further includes microprocessor means for identifying the one rotational position of said establishing means from said subset of possible rotational positions that corresponds to the rotational position of said specific one of said first magnetic fields.

8. A commutatorless direct current motor having a rotor for rotating with respect to a stator, said motor comprising:

(a) means, provided on the rotor, for establishing a plurality of first magnetic fields;

(b) means, provided on the stator, for inducing a second magnetic field, said inducing means including a plurality of windings; and (c) control means, coupled to said inducing means, for directing a short-period inducement of said second magnetic field, said control means including means for monitoring the interaction of said short-period induced second magnetic field with said first magnetic fields, wherein each short-period inducement of said second magnetic field is obtained by the application of a current pulse through a respective phase pair of said windings as selected by said control means, wherein said monitoring means monitors the current pulse response of each said phase pair of said windings.

9. The motor of claim 8 wherein said monitoring means detects a peak voltage obtained in response to the application of each current pulse to each said phase pair of said windings.

10. A commutatorless direct current motor including an armature having a plurality of windings, each winding having first and second ends and wherein the first ends of the windings are connected together, and a plurality of magnets supported in a rotor so as to be rotatable with respect to the armature through a plurality of discrete rotational commutation positions, said motor comprising:

(a) control means, coupled to the respective second ends of the windings, for providing commutation power to the windings; and (b) means for applying a pulse of commutation power to the windings, where said pulse of commutation power is sufficient to alter the rotational position of said rotor, to determine the rotational position of the magnets with respect to the windings.

11. The motor of claim 10 wherein said pulse applying means is coupled to each of the second ends of the windings to enable the application of said pulse of commutation power to each of the windings.

12. The motor of claim 11 further comprising means, coupled to each of the second ends of the windings, for measuring the response of the windings to the application of said pulse of commutation power.

13. The motor of claim 12 wherein said measuring means measures the peak value of a return high-frequency signal obtained in response to the application of said pulse of commutation power to the windings.

14. The motor of claim 13 wherein said pulse applying means selectively applies said pulse of commutation power to pairs of the second ends of the windings such that said pulse of commutation power is serially conducted through pairs of the windings via their respective first ends.

15. The motor of claim 14 wherein said control means, responsive to said measuring means, selectively determines the commutation order of applying commutation power to the windings to rotate the plurality of magnets in a predetermined direction.

16. The motor of claim 15 wherein said control means is capable of relying exclusively on said measuring means for determining the rotational position of the plurality of magnets with respect to the armature.

17. In a commutatorless direct current motor having an armature and a multiple-magnet rotor, wherein said armature includes a plurality of windings for generating torque-inducing magnetic fields in response to current pulses and wherein: said multiple-magnet rotor is caused to rotate between rotational positions relative to said armature in response to the application of long-duration current pulses to the windings, an improvement permitting the unique armature relative rotational position of said multiple-magnet rotor to be identified exclusively through the use of said windings as positional sensors, said improvement comprising:
(a) control means for applying a a respective short-duration current pulse to each phase pair of said windings, said short-duration current pulses being insufficient to rotate said multiple-magnet rotor between rotational positions; and
(b) means for detecting the respective response of the phase pairs of said windings to said short-duration current pulse.

18. The motor of claim 17 wherein said control means selectively applies said short-duration current pulse to the phase pairs of said windings, wherein said detecting means detects a distinguishing response from the phase pairs of said windings and wherein said control means, responsive to said detecting means, determines the unique armature relative rotational position of said multiple-magnet rotor.

19. The motor of claim 18 wherein said control means monitors a peak voltage developed across said windings in response to the application of short-duration current pulse, the winding for which a highest peak voltage is detected being associated with a specific location on said multiple-magnet rotor.

20. The motor of claim 19 wherein said control means applies said short-duration current pulse to each phase winding of said motor and wherein said short-duration current pulse has a predetermined duration insufficient to alter the rotational position of said multiple-magnet rotor with respect to said armature.

21. A commutatorless direct current motor comprising:
(a) an armature including a plurality of windings having first and second ends, said first ends of said windings being connected together, whereby sets of two said second ends define phase pairs of said windings;

(b) a permanent magnet motor assembly including a plurality of magnets and rotatable with respect to said armature; and
(c) control means, coupled to said respective second ends of said windings, for directing the operation of said motor, said control means including means for selectively providing commutation power to phase pairs of said windings, means for successively applying a short-duration current pulse to each phase pair of said windings, means for detecting a peak voltage developed across said second ends of each phase pair of said windings, means for comparing the detected peak voltages of each phase pair of said windings, and means for identifying a specific one of said magnets as being positionally related to the one of the phase pairs of said windings corresponding to a largest phase pair peak voltage detected.

22. A system for controlling the rotation of a motor having a rotor with multiple magnetic poles and a stator with a plurality of windings permitting the conduction of torque inducing current therein, said system comprising:
(a) means for selecting windings for the conduction of current to cause rotation of the rotor;
(b) means for applying a short-duration current pulse to selected ones of the windings; and
(c) control means, responsive to the characteristics of the response of the windings to the application of the short-duration current pulse, for controlling said selecting means and said applying means to determine the unique position of the magnetic poles of the rotor with respect to the windings, said control means including means for sensing the peak voltage developed by the selected ones of the windings in response to the application of the short-duration current pulse.

23. The system of claim 22 wherein the selected ones of the windings are related in groups or phases, wherein each short-duration current pulse is applied to a respective phase and wherein said control means further includes means for comparing the peak voltage sensed by said sensing means for each phase.

24. A control system for providing rotation control of a hard-disk drive spin motor wherein the spin motor includes a rotor having a plurality of permanent magnet poles and a stator having a plurality of windings, each winding having first and second ends with the first ends of the windings being interconnected, said control system comprising:
(a) a spin motor driver coupled to the second ends of the windings for conducting current pulse through phase pairs of the windings defined by pairs of second ends, said spin motor driver providing a sense signal proportional to the magnitude of the current pulse conducted through the windings;
(b) a control circuit coupled to said spin motor drive to provide control signals for the selection of phase pairs of windings for the conduction of the current pulse, said control circuit including timing means for establishing the period of the application of respective current pulses to phase pairs of windings including a long-duration period current pulse to induce the rotation of the rotor to a different pole position with respect to the windings and a short-duration period current pulse wherein the short-duration current pulse conducted by a selected phase pair of windings is less than sufficient to induce rotation of the rotor to a different pole position with respect to the windings, said control circuit including microprocessor means, responsive to said sense signal as respectively produced in response to the conduction of current pulse for a short-duration period by each of the phase pairs of windings, for determining the unique pole position of the rotor with respect to the phase pairs of windings.

25. The control system of claim 24, wherein said microprocessor means includes means for detecting a peak voltage across each phase pair of windings developed in response to the conduction of current pulse for the short-duration period through the respective phase pairs of windings, said microprocessor means being responsive to said detecting means for identifying the phase winding pair for which a largest magnitude peak voltage is detected.

26. The control system of claim 25 wherein the motor operates to rotate a hard disk media and wherein said control circuit includes means for monitoring the back-EMF developed in the phase pairs of windings in response to the rotation of the rotor and means for obtaining rotation rate feedback information from the hard disk media.

27. A method of operating a control system for providing rotation control of a hard-disk drive spin motor, wherein the spin motor includes a rotor having a plurality of permanent magnet poles and a stator having a plurality of windings, each winding having first and second ends with the first ends of the windings being interconnected and wherein a spin motor drive current circuit is coupled to the second ends of the windings for switching current through phase pairs of the windings as defined by pairs of said second ends, said spin motor drive current circuit providing a sense signal proportional to the magnitude of the current conducted through the phase pairs of windings, the method comprising the steps of:
(a) applying a short-duration period current pulse to each phase pair of windings, where said short-duration current pulse is insufficient to cause rotation of said rotor to the next pole position relative to said stator;
(b) acquiring the sense signal produced by said spin motor drive current circuit in response to the respective application of the short-duration period current pulses;
(c) comparing the sense signals acquired to identify a phase pair of windings corresponding to an acquired sense signal distinguishable from the remaining acquired sense signals; and
(d) selecting a phase pair of windings for the conduction of a long-duration period current pulse to induce rotation of the rotor.

28. The method of claim 27 further comprising the step of substantially maintaining a predetermined level of current conducted through the phase pairs of windings in response to the long-duration period current pulses as the rotational speed of the rotor increases.

29. A method of operating a control system in hard-disk media for providing rotation control of a hard-disk drive spin motor, wherein the spin motor includes a rotor having a plurality of permanent magnet poles and a stator having a plurality of windings, each winding having first and second ends with the first ends of the windings being interconnected and wherein a spin motor drive current circuit is coupled to the second ends of the windings for switching current through phase pairs of the windings as defined by pairs of said second ends, said spin motor drive current circuit providing a sense signal proportional to the magnitude of the current conducted through the phase pairs of windings, the method comprising the steps of:
(a) initiating the rotation of the rotor to a first predetermined rotation rate by repeating the steps of:
(i) applying a short-duration period current pulse to a phase pair of windings, where said short-duration current pulse is insufficient to cause rotation of said rotor to the next pole position relative to said stator;
(ii) acquiring the sense signal produced by said spin motor drive current circuit in response to the application of the short-duration period current pulse;
(iii) comparing the sense signals acquired for each phase pair of windings to identify a phase pair of windings corresponding to an acquired sense signal distinguishable from the remaining acquired sense signals; and
(iv) selecting a phase pair of windings for the conduction of current to induce rotation of the rotor;
(b) increasing the rotation rate of the motor to a second predetermined rate by repeating the steps of:
(i) sensing the back-EMF developed in the phase pairs of windings; and
(ii) providing current to a next phase pair of windings selected from a predetermined series of phase pair winding commutation states in response to the sensing of a predetermined level of back-EMF; and
(c) maintaining the rotation race of the rotor at a third predetermined rate by repeating the steps of:
(i) receiving rotation rate feedback information from the hard disk media; and
(ii) adjusting the level of current provided to the phase pairs of windings to compensate for deviation of the rotation rates of the rotor from the third predetermined rate.

30. The method of claim 29 further comprising the step of maintaining a predetermined level of current conducted through the phase pairs of windings as the rotational speed of the rotor increases.

* * * * *

UNITED STATES PATENT AND TRADEMARK OFFICE
CERTIFICATE OF CORRECTION

PATENT NO. : 4,876,491
DATED      : October 24, 1989
INVENTOR(S): Squires, et al.

It is certified that error appears in the above-identified patent and that said Letters Patent is hereby corrected as shown below:

In Claim 1, Column 11, line 22 of the Patent, change "high" to --highest--.

Signed and Sealed this

Fourth Day of May, 1993

Attest:

MICHAEL K. KIRK

Attesting Officer

Acting Commissioner of Patents and Trademarks